United States Patent [19]
Sato et al.

[11] Patent Number: 5,624,595
[45] Date of Patent: Apr. 29, 1997

[54] REFRIGERANT COMPOSITION

[75] Inventors: Eiichi Sato, 802-8, Nagamine-machi, Kumamoto-shi, Kumamoto, Japan; Oho Suk Jae, Seoul, Rep. of Korea

[73] Assignee: Eiichi Sato, Kumamoto, Japan

[21] Appl. No.: 590,597

[22] Filed: Jan. 24, 1996

[30] Foreign Application Priority Data

Jan. 25, 1995 [JP] Japan .................................. 7-027679

[51] Int. Cl.$^6$ .................................................. C09K 5/04
[52] U.S. Cl. .................................................. 252/68; 252/67
[58] Field of Search .................................. 252/67, 68, 70, 252/71, 73

[56] References Cited

FOREIGN PATENT DOCUMENTS

| | | |
|---|---|---|
| 5-339563 | 12/1993 | Japan . |
| 6-100854 | 4/1994 | Japan . |
| 6-241589 | 8/1994 | Japan . |

OTHER PUBLICATIONS

Chemical Abstract No. 110:10200u, abstract of Japanese Patent Specification No. 63-152,690 published on 25 Jun. 1988.

Chemical Abstract No. 110:10201v, abstract of Japanese Patent Specification No. 63-152,689 published on 25 Jun. 1988.

*Primary Examiner*—Anthony Green
*Attorney, Agent, or Firm*—Armstrong, Westerman, Hattori, McLeland & Naughton

[57] ABSTRACT

A non-azeotropic refrigerant composition which can be used in refrigerators originally designed to use a Freon refrigerant without the need of changing the specifications thereof, and which is harmless to men and environment. The refrigerant composition consists essentially of 70 parts by weight of butane ($C_4H_{10}$), 25 parts by weight of ethyl ether ($(C_2H_5)_2O$, and 5 parts by weight of dimethyl polysiloxane (silicone oil). The refrigerant composition exhibits approximately the same characteristics as those of R-12 and R-134$a$. Ethylene glycol and propylene glycol may be added thereto.

7 Claims, No Drawings

REFRIGERANT COMPOSITION

BACKGROUND OF THE INVENTION

1. Field of the Invention

The present invention relates to a refrigerant composition used in refrigerators or other similar machines and also relates to a method of producing the refrigerant composition. More particularly, the present invention relates to a refrigerant composition containing at least a refrigerant gas composed of a paraffin hydrocarbon, a silicone oil, and an ether.

2. Description of the Background Art

A typical refrigerator has a compressor, a condenser, an evaporator, a receiver, an oil separator, a liquid separator, etc., which constitute a refrigerating cycle. The purpose of a refrigerator is to absorb heat from a low temperature heat source and to release the heat where the temperature is high, which resembles the use of a pump to raise water to a higher place. Therefore, the refrigerator is also called "heat pump".

Meantime, when the purpose of a refrigerator is to release heat into a high-temperature heat source so as to use it for heating, the system is also called "heat pump air conditioning unit". A refrigerant used in the refrigerating cycle is evaporated at low temperature in the evaporator to form a high-temperature, high-pressure gas, which is then cooled in the condenser to return to a liquid refrigerant. In this way, the refrigerant circulates in the refrigerator, thereby continuously performing a refrigerating operation. Typical examples of refrigerants used for this purpose include ammonia, carbon dioxide gas, chlorofluorohydrocarbon (hereinafter occasionally referred to as "CFC") gases, that is, fluorine-containing carbonized compounds [Freon (Flon) gases] such as R-11, R-12, R-13, R-21, R-22, R-113, R-114, R-500 and R-502, propane, etc.

CFC gases, i.e. Freon gases, and ammonia are mainly used as refrigerants. Freon gases are also used as an azeotropic refrigerant which is formed by mixing together two different kinds of Freon gas, but which functions as if it were composed of only one kind of Freon gas. However, ammonia is a toxic, combustible and explosive gas although it is excellent in refrigerant characteristics such as refrigerating capacity. Moreover, ammonia corrodes copper and a copper alloy when air and water content get mixed in it.

In contrast, Freon refrigerants are excellent in refrigerant characteristics such as refrigerating capacity as well as non-combustible and non-explosive, and they are neither corrosive with respect to metals nor toxic to the human body. Accordingly, Freon gases are superior refrigerants. However, since it became clear that Freon gases destroy ozone ($O_3$) in the stratosphere, specific Freons, i.e. R-11, R-12, R-113, R-114 and R-115, have become subject to regulations. R-12 is mainly used in relatively small-sized refrigerating machines such as automobile air conditioners and domestic refrigerators. R-22 (hereinafter occasionally referred to as "HCFC" Freon) is used in medium-and large-sized compressors because the refrigerating capacity per unit volume is larger than that of R-12.

The "HCFC" Freon will also become subject to regulations. R-113 and R-114 are mainly used in turbo-refrigerators. A mixture of Freon gases, for example, R-115 and R-22, is used as a refrigerant for low-temperature use application in the form of azeotropic refrigerant R-502. At any rate, R-22 may also become subject to regulations in addition to the above-described Freons. In such a case, all the Freons and Freon-containing azeotropic refrigerants will become unusable.

In refrigerators, a refrigerating machine oil is used as a lubricant for protecting the compressor and other constituent elements from wear. It is demanded to use a refrigerating machine oil which does not lose its lubricating properties even at low temperature and which can stably coexist with a refrigerant. In the case of a Freon refrigerant, the liquid refrigerant and the refrigerating machine oil are soluble in each other up to a certain temperature. A Freon refrigerator is designed so that the refrigerating machine oil is discharged from the compressor and returned to the crank case thereof after circulating through the system. Thus, the refrigerator is capable of automatic operation. When a compressor that needs a large amount of refrigerating machine oil is used, or when the refrigerant piping distance is long, an oil separator is used.

Under these circumstances, various Freon substitutes have been proposed. However, many of these proposals are concerned with substitute Freons for "HCFC" Freons such as R-22, R-123, etc., which are not subject to regulations for the moment, and azeotropic refrigerants formed by mixing together these substitute Freons. Accordingly, none of the Freon substitutes have characteristics adequate to completely substitute for the existing Freon refrigerants. There have been proposed domestic refrigerators that use a non-azeotropic refrigerant other than Freon, for example, propane. However, this type of refrigerator involves problems in terms of combustibility and explosiveness.

Japanese Patent Application Unexamined Publication (KOKAI) No. 5-339563 proposes a flame-retarded refrigerant which consists essentially of LPG and a silicone added thereto, or a refrigerant consisting essentially of an alcohol, LPG, propane or butane, and an aqueous silicone added thereto. However, such refrigerants cannot be used for refrigerators that are originally designed to use Freon refrigerants, such as the existing domestic refrigerators and automobile air conditioners. That is, the new refrigerants do not match this type of refrigerator in terms of the capacity of the compressor used in the refrigerator, i.e. the compression efficiency, and power required to operate the compressor.

To use these newly proposed refrigerants, the basic design of the compressor and other constituent elements of the refrigerator must be changed. The design change causes the cost to increase exceedingly, resulting in a waste of resources. It would cost immeasurably to dispose of the existing automobile air conditioners and refrigerators that use Freon refrigerants and of production facilities for these refrigerating machines or to change the production facilities.

SUMMARY OF THE INVENTION

An object of the present invention is to provide a non-azeotropic refrigerant composition as a substitute for Freon refrigerants, and also provide a method of producing the refrigerant composition.

Another object of the present invention is to provide a refrigerant composition which can be used in a refrigerator that is originally designed to use a Freon refrigerant without design change of the refrigerator structure, and also provide a method of producing the refrigerant composition.

Still another object of the present invention is to provide a refrigerant composition which is harmless to men and terrestrial environment, and also provide a method of producing the refrigerant composition.

To attain the above-described objects, the present invention provides the following refrigerant compositions:

First Refrigerant Composition

The first refrigerant composition is a refrigerant composition used in a refrigerator including a compressor, a condenser, a receiver, an expansion valve, an evaporator, etc. The first refrigerant composition consists essentially of at least one refrigerant gas selected from among paraffin hydrocarbons, a silicone oil for flame-retarding the refrigerant gas, and at least one ether.

The above-described refrigerator may have any type of existing compressor, e.g., a reciprocating compressor, a rotary compressor, a screw compressor, a scroll compressor, etc., as long as the compressor is used with a Freon refrigerant and of the positive displacement type. In particular, the refrigerant composition according to the present invention can effectively be applied to a refrigerator that is originally designed to use a Freon refrigerant without the need of changing the specifications of the compressor and other constituent elements of the refrigerator.

The refrigerant composition according to the present invention can be used in any type of refrigerator that has an oil separator, a liquid separator, a four-way valve, etc. in addition to the above-mentioned constituent elements. It is preferable for the refrigerator to have these devices. As the refrigerating machine oil, standardized products (ISO VG 10 to 100, etc.), which are specified by International Organization for Standardization (ISO), may be used alone or in the form of a mixture.

The refrigerator performs an operation in which a refrigerant gas evaporated in the low-temperature evaporator is compressed in the compressor to form a high-temperature gas, which is then sent to the condenser. If the heat released in the condenser in this refrigerating cycle is used for heating, it is much more economical than heating effected by using an electric heater. The refrigerant composition according to the present invention can also be applied to such a heat pump refrigerator. The refrigerant composition can also be applied to a heat pump air conditioner which is capable of both cooling and heating, for example, by a method in which air is cooled by an evaporator installed outdoors and air is heated by a condenser installed indoors. Accordingly, the concept of "refrigerator" in the present invention includes so-called heat pumps which discharge hot air or hot water with well water, air, etc. used as a heat source for the purpose of cooling air, a liquid, a solid, etc.

The refrigerant gas is a paraffin hydrocarbon, which is a saturated chain type hydrocarbon of the general formula $C_nH_{2n+2}$, which is also known as alkane or methane hydrocarbon. It is desirable to use paraffin hydrocarbons in which n is small and which are gaseous at ordinary temperatures and ordinary pressure: e.g. methane, in which the carbon number n is 1; ethane, in which the carbon number n is 2; propane, in which the carbon number n is 3; and butane, in which the carbon number n is 4. These paraffin hydrocarbons may be used alone or in the form of a mixture. However, propane and butane are desirable from the viewpoint that these paraffin hydrocarbons are less corrosive with respect to the devices constituting the refrigerator.

Further, it is preferable to select a refrigerant gas from among those which are industrially easy to obtain. After required conditions, e.g. a required refrigerating capacity, a type of refrigerator, a refrigeration temperature, etc., have been determined, one or more refrigerant gases are selected from those mentioned above and used alone or in the form of a mixture of a plurality of refrigerant gases. It is preferable to use a refrigerant gas according to such selection references that it has no reactivity and it is industrially easy to obtain and inexpensive.

However, ethane $C_2H_6$ is used in reciprocating refrigerators in an ultra-low temperature region, i.e. −60° C. or less. Propane $C_3H_8$ is used in reciprocating refrigerators in the temperature range of from an ultra-low temperature region to a low-temperature region, i.e. −20° C. to −60° or less. Therefore, when ethane or propane is used as a substitute for R-12, an ether is mixed with it, as described later, in order to lower the boiling point.

A silicone oil used in the present invention is mixed with the above-described refrigerant gas in order to flame-retard the refrigerant gas. A silicone which is oily at ordinary temperatures is used. It is known that silicone oils have the following features: small viscosity changes with changes in temperature; low freezing point; chemical inertness; small surface tension; favorable water repellence, anti-foaming and release properties; excellent electrical insulating properties; and so forth.

However, it is unknown that the above-described refrigerant gas is flame-retarded by adding a silicone oil to the refrigerant gas. Particularly, addition of a silicone oil to a paraffin hydrocarbon enables the paraffin hydrocarbon to be safely used as a refrigerant in domestic refrigerators because the paraffin hydrocarbon will not explosively burn even if it is ignited. It is desirable to use a silicone oil having the following dimethyl polysiloxane structure, which is a kind of straight silicone oil:

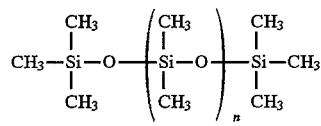

This silicone oil is a synthetic oil, which is not in nature, and which comprises the same inorganic siloxane bond (Si-O-Si) as that of glass and quartz, which is resistant to heat, and an organic methyl group. However, it is preferable to use a silicone oil having a viscosity of from 0.65 {0.65} to 10 {10} mm$^2$/s {cSt} (at 25° C.) and a specific gravity of from 0.760 to 0.935 (at 25° C.).

Further, it is possible to use a methyl phenyl silicone oil in which a part of the methyl group of dimethyl silicone oil has been replaced by a phenyl group, or a methyl hydrogen silicone oil in which a part of the methyl group of dimethyl silicone oil has been replaced by hydrogen. It is also possible to use various types of modified silicone oil having various structures: one in which polysiloxane has an organic group introduced to a side chain thereof (side-chain type); another in which polysiloxane has organic groups introduced to both ends thereof (double-end type); another in which polysiloxane has an organic group introduced to one end thereof (single-end type); another in which polysiloxane has organic groups introduced to a side chain and both ends thereof (side-chain and double-end type); and so forth.

Ethers used in the present invention are those which have an organic compound (R—O—R') structure where two hydrocarbon groups R and R' are bonded to an oxygen atom, and which are colorless, transparent, neutral, aromatic and volatile liquids used as reagents, intermediates, anesthetics, solvents, etc. Examples of such ethers are single ethers, e.g. methyl ether $(CH_3)_2O$ and ethyl ether $(C_2H_5)_2O$, and composite ethers, e.g. methyl ethyl ether $(CH_3OC_2H_5)$, phenetole $(C_6H_5OC_2H_5)$, which is phenol ether, and diphenyl ether $(C_6H_5OC_6H_5)$. These ethers may be used alone or in the form of a mixture.

The first refrigerant composition according to the present invention is produced by the following method. An autoclave is evacuated of air as much as possible by using a vacuum pump. At least one refrigerant gas selected from among paraffin hydrocarbons is injected into the autoclave. Further, a silicone oil is added to the refrigerant gas in the autoclave, and the mixture is stirred for a predetermined time. Further, at least one ether is injected into the mixture, and the resulting mixture is stirred for a predetermined time, thereby completing a refrigerant composition. These production steps are carried out at ordinary temperatures.

For the first refrigerant composition according to the present invention, it is desirable to select a chemical composition comprising 65 to 80 parts by weight of a refrigerant gas, 5 to 10 parts by weight of a silicone oil, and 15 to 30 parts by weight of an ether.

Second Refrigerant Composition

The second refrigerant composition is a refrigerant composition used in a refrigerator including a compressor, a condenser, a receiver, an expansion valve, an evaporator, etc. The second refrigerant composition consists essentially of at least one refrigerant gas selected from among paraffin hydrocarbons, a silicone oil for flame-retarding the refrigerant gas, at least one ether, and at least one polyhydric alcohol.

A refrigerator to which the second refrigerant composition is applied is the same as that to which the first refrigerant composition is applied. Further, the second refrigerant composition uses a refrigerant gas, a silicone oil and an ether which are the same as those used in the first refrigerant composition; therefore, description thereof is omitted. As the above-described alcohol, any kind of alcohol, e.g. monohydric and polyhydric alcohols, can be used. However, the alcohol preferably contains at least one polyhydric alcohol. More specifically, it is preferable to use a mixture of propylene glycol and ethylene glycol.

The reason for using at least one polyhydric alcohol for the above-described alcohol is to reduce the flammability of the above-described refrigerant gas, which is a paraffin hydrocarbon. Further, polyhydric alcohols can prevent corrosion of metals, synthetic resins, rubber and other materials constituting the refrigerator. In addition, polyhydric alcohols are viscous and hence capable of functioning as a lubricating oil for the refrigerator.

Examples of First Refrigerant Composition

A first example of the present invention will be explained below.

First Example

A refrigerant composition according to the first example is produced by the following method. An autoclave is evacuated of air as much as possible by using a vacuum pump. 70 parts by weight of butane is injected into the autoclave. Further, 5 parts by weight of dimethyl polysiloxane is added to the butane in the autoclave, and the mixture is stirred for a predetermined time. Further, ethyl ether is injected into the mixture, and the resulting mixture is stirred for a predetermined time, thereby completing a refrigerant composition. These production steps are carried out at ordinary temperatures.

None of the added substances leaked during the production process, and it was possible to produce the following mixture as a final product. Although some of the mixed substances might have chemically reacted, it could not be confirmed. The refrigerant composition shows a pressure of about 3 kg/mm² at ordinary temperatures.

| Chemical composition of First Example: | |
| --- | --- |
| a. Butane ($C_4H_{10}$) | 70 parts by weight |
| b. Ethyl ether ($(C_2H_5)_2O$) (boiling point: 34.60° C.) | 25 parts by weight |
| c. Dimethyl polysiloxane | 5 parts by weight |

It should be noted that KF96L-0.65CS, manufactured by Shin-etsu Chemical Industry Co., Ltd. (Chiyoda-ku, Tokyo, Japan), was used as dimethyl polysiloxane. KF96L-0.65CS is a linear dimethyl polysiloxane which has a trimethylsilyl group at a terminal thereof, and it has a viscosity of 0.65 mm²/s{cSt} (at 25° C.) and a specific gravity of 0.76 (at 25° C.). KF96L-0.65CS has the following structure:

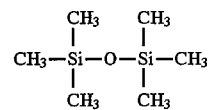

The refrigerant composition according to the first example has a freezing point of −94.8° C., a boiling point of −27.0° C. and a critical temperature of 124.4° C.

Second Example

| Chemical composition of Second Example: | |
| --- | --- |
| a. Butane ($C_4H_{10}$) | 65 parts by weight |
| b. Ethyl ether ($(C_2H_5)_2O$) | 30 parts by weight |
| c. Dimethyl polysiloxane | 5 parts by weight |

Substances used in the second example were the same as those in the first example. The production method was also the same as that in the first example except the amounts of components used.

The refrigerant composition according to the second example has a freezing point, a boiling point and a critical temperature which are substantially the same as those of the refrigerant composition according to the first example.

Third Example

| Chemical composition of Third Example: | |
| --- | --- |
| a. Butane ($C_4H_{10}$) | 70 parts by weight |
| b. Ethyl ether ($(C_2H_5)_2O$) | 20 parts by weight |
| c. Dimethyl polysiloxane | 10 parts by weight |

Substances used in the third example were the same as those in the first example. The production method was also the same as that in the first example except the amounts of components used.

The refrigerant composition according to the third example has a freezing point, a boiling point and a critical temperature which are substantially the same as those of the refrigerant composition according to the first example.

Examples of Second Refrigerant Composition

A second refrigerant composition as a fourth example is produced by the following method. An autoclave is evacuated of air as much as possible by using a vacuum pump. 70 parts by weight of butane is injected into the autoclave. Further, 5 parts by weight of dimethyl polysiloxane is added to the butane in the autoclave, and the mixture is stirred for a predetermined time.

Further, 20 parts by weight of ethyl ether is injected into the mixture, and the resulting mixture is stirred for a predetermined time. Furthermore, 2.5 parts by weight of ethylene glycol and 2.5 parts by weight of propylene glycol are injected into the mixture, and the resulting mixture is stirred for a predetermined time, thereby completing a refrigerant composition. These production steps are carried out at ordinary temperatures. None of the added substances leaked during the production process, and it was possible to produce the following mixture as a final product. Although some of the mixed substances might have chemically reacted, it could not be confirmed.

Fourth Example

| Chemical composition of the Fourth Example: | |
|---|---|
| a. Butane ($C_4H_{10}$) | 70 parts by weight |
| b. Ethyl ether ($(C_2H_5)_2O$) | 20 parts by weight |
| c. Dimethyl polysiloxane | 5 parts by weight |
| d. Ethylene glycol | 2.5 parts by weight |
| e. Propylene glycol | 2.5 parts by weight |

The used substances and the production method are the same as those in the first example except ethylene glycol and propylene glycol.

Various Comparative Experiments

Table 1 shows the results of testing of the examples for their refrigerating capacities carried out by using a commercially available domestic refrigerator. The test was carried out by the evaporator calorimeter method specified in Testing of Refrigerant Compressors (JIS B8606) according to Japanese Industrial Standard.

Table 2 shows the relative values of pressure at different temperatures of different kinds of refrigerant. The pressure was measured by injecting each refrigerant into the compressor used in the experiment, and the numerals of the absolute values are not necessarily accurate.

TABLE 1

Results of Comparative Testing for Refrigerating Capacity of Refrigerants

| Items | Freon R-12 (180 g) | Refrigerants of first embodiment of the invention | | |
|---|---|---|---|---|
| | | Example 1 | Example 2 | Example 3 |
| A. Temperature characteristics | | | | |
| Evaporator inlet temp. (°C.) | −30.7 | −36.2 | −35.6 | −35.5 |
| Evaporator outlet temp. (°C.) | −30.3 | −33.8 | −33.2 | −33.0 |
| Freezing chamber temp. 1/3H (°C.) | −25.7 | −29.6 | −29.2 | −29.0 |
| Cold storage chamber temp. 1/3H (°C.) | −3.0 | −5.2 | −4.8 | −4.6 |
| Compressor suction temp. (°C.) | 29.2 | 17.7 | 25.1 | 21.4 |
| Compressor discharge temp. (°C.) | 73.9 | 81.3 | 74.4 | 72.4 |
| Compressor body top temp. (°C.) | 60.6 | 60.6 | 55.6 | 53.7 |
| Compressor body bottom temp. (°C.) | . . . | 75.2 | 67.1 | 60.9 |
| Condenser outlet temp. (°C. | 59.4 | 78.0 | . . . | . . . |
| Anbiant temp. (°C.) | 29.0 | 29.0 | 29.3 | 31.4 |
| B. Electrical values measured by secondary refrigerant calorimeter | | | | |
| Compressor input current (A) | 0.818 | 0.802 | 0.866 | 0.875 |
| Compressor power consumption (W) | 148.9 | 150.2 | 153.0 | 55.0 |
| Compressor input voltage (V) | 185.0 | 160.0 | 165.0 | 170.0 |
| Calorimeter input voltage (V) | 140.0 | 145.0 | 150.0 | 155.0 |
| Calorimeter saturated pressure (Psig) | 50.0 | 55.0 | 65.0 | 60.0 |

Refrigerator SR-N4133G (model name) manufactured by SAMSUNG Co., Ltd., Seoul, Korea was used. Test was carried out by Pull-Down (with temperature sensor removed) at a room temperature of 30° C. and a humidity of 75%. Freezing and cold storage chamber temperatures were measured at a position of 1/3H of the overall height H.

The comparative data in Table 1 shows that the examples of the present invention assume almost the same numerical values as those of Freon R-12 and can be used as substitutes for it.

TABLE 2

Comparative Testing for Pressure-Temperature Characteristics of Refrigerants

| Kinds of Refrigerant | Temperature (°C.) | Pressure ($kgf/cm^2$) (relative values) | Temperature (°C.) | Pressure ($kgf/cm^2$) |
|---|---|---|---|---|
| R-12 | −23.3 | 0.742578 | 54.4 | 12.65 |
| R-134a | | 0.141084 | | 13.95 |
| Example 1 | | 0.199335 | | 11.85 |

Saturated vapor pressures at different temperatures −23.3° C. and 54.4° C. were measured.
Measurement was carried out by injecting each refrigerant into the compressor.

Table 3 comparatively shows data concerning the refrigerating capacities of R-134a and the refrigerant compositions according to the present invention measured by using a calorimeter. It will be understood that the refrigerant compositions according to the present invention are not inferior to R-134a.

described refrigerating machine oil, and a mixture (Example 2/ALKYL BENZENE) of the refrigerant composition according to the second example of the present invention and alkyl benzene, which is generally used as a refrigerating machine oil, with respect to various parts used in a refrigerator.

TABLE 3

| Comparative Testing of R-134a (SK182B-L2WR) and Refrigerants of Invention by Calorimeter | | | | | |
|---|---|---|---|---|---|
| Items | Kinds of refrigerant | Refrigerating capacity (kcal/WH) | Compressor power consumption (Watt) | EER (Btu/WH) | Compressor current (Amp) |
| Comparative testing 1 | R-134a | 261.87 | 192.4 | 5.40 | 0.98 |
|  | Example 1 | 268.97 | 193.2 | 5.50 | 0.99 |
| Comparative testing 2 | R-134a | 266.26 | 196.6 | 5.37 | 1.00 |
|  | Example 2 | 267.50 | 195.1 | 5.40 | 1.00 |
| Comparative testing 3 | R-134a | 256.10 | 189.9 | 5.35 | 0.97 |
|  | Example 3 | 260.20 | 195.5 | 5.39 | 1.01 |
| Average | R-134a | 261.41 | 193.0 | 5.37 | 0.98 |
|  | Present invention | 265.55 | 194.6 | 5.43 | 1.00 |

R-134a shows a pressure of 1.116 $kg/cm^2$ at compressor suction opening and a discharge pressure of 11.8 $kg/cm^2G$ (54.4° C.).
1 Btu = 1.05506 KJ.

Table 4 shows the results of testing for corrosion observed on various parts used in a refrigerator when these parts were exposed to the refrigerant compositions according to the present invention.

In order to shorten the test period, each of the various parts was exposed to each of the above-described mixtures for 21 days under environmental conditions of 130° C., and a rate of change of the weight of each parts before and after

TABLE 4

| Testing for Corrosion on Refrigerator Parts by New Refrigerants | | | | | | | | | | | | | |
|---|---|---|---|---|---|---|---|---|---|---|---|---|---|
| Refrigerator parts | Standard after test | R-12/2GSD | | | | Example 1/2GSD | | | | Example 2/ALKYL BENZENE | | | |
|  |  | Before test | After test | Amount of change | Rate of change | Before test | After test | Amount of change | Rate of change | Before test | After test | Amount of change | Rate of change |
| Pet-film | Weight change within +3% | 7.729 | 7.793 | 0.064 | 0.8 | 8.256 | 8.436 | 0.180 | 2.2 | 8.449 | 8.599 | 0.150 | 1.8 |
| Magnet wire |  | 39.738 | 39.754 | 0.016 | 0.1 | 62.536 | 62.586 | 0.050 | 0.8 | 59.272 | 59.342 | 0.070 | 0.1 |
| Muff-body |  | 36.813 | 37.289 | 0.476 | 1.3 | 35.699 | 36.076 | 0.377 | 1.1 | 35.746 | 36.076 | 0.330 | 0.9 |
| Pet-yarn |  | 2.760 | 2.862 | 0.102 | 3.7 | 4.373 | 4.437 | 0.064 | 1.5 | 4.188 | 4.334 | 0.146 | 3.5 |
| Pet-tube |  | 0.224 | 0.226 | 0.002 | 0.9 | 0.240 | — | — | — | 0.240 | 0.241 | 0.001 | 0.4 |
| Yarn tube |  | 0.305 | 0.303 | −0.002 | −0.7 | 0.320 | 0.324 | 0.004 | 1.3 | 0.306 | 0.303 | −0.003 | −1.0 |
| Cluster block |  | 3.424 | 3.469 | 0.045 | 1.3 | 3.378 | 3.431 | 0.053 | 1.6 | 3.366 | 3.408 | 0.042 | 1.3 |
| Lead wire |  | 6.755 | 6.897 | 0.142 | 2.1 | 6.900 | 7.059 | 0.159 | 2.3 | 6.938 | 7.100 | 0.162 | 2.3 |
| Head gasket |  | 1.014 | 1.058 | 0.044 | 4.3 | 1.061 | 1.095 | 0.034 | 3.2 | 1.067 | 1.087 | 0.020 | 1.9 |
| Valve gasket |  | 0.658 | 0.627 | −0.031 | −4.7 | 0.560 | 0.538 | −0.022 | −3.9 | 0.825 | 0.780 | −0.045 | −5.5 |
| Steel gasket |  | 5.346 | 5.341 | −0.005 | −0.1 | 4.426 | 4.421 | −0.005 | −0.1 | 4.394 | 4.382 | −0.012 | −0.3 |

| Oil evaluation | Standard after test | Before test | After test | Before test | After test | Before test | After test |
|---|---|---|---|---|---|---|---|
| Oil color | 3.0 or less | 0.5 | 2.5 | 0.5 | 2.0 | 0.5 | 0.5 |
| Oil water content | 100 PPM or less | 20 | 30 | 20 | 33 | 20 | 29 |
| Oil total content | 0.1 mgKOH/g or less | 0.016 | 0.117 | 0.016 | 0.139 | 0.023 | 0.152 |
| Oligomer | 100 mg/ 100 cc or less | 34 | | 44 | | 28 | |

Table 4 shows data concerning a comparison between a mixture (R-12/2GSD) of the conventional Freon R-12 and a presently used refrigerating machine oil (2GSD according to ISO), a mixture (Example ½ GSD) of a refrigerant composition according to the present invention and the abovethe exposure was measured. It has been found that there is no practical difference between the data concerning the mixture of a refrigerant composition according to the present invention and a refrigerating machine oil and the data (R-12/2GSD) concerning the mixture of the conventional Freon R-12 and the presently used refrigerating machine oil (2GSD according to ISO) with respect to any of the parts constituting the refrigerator, and that the refrigerant compositions according to the present invention are free from problems in terms of corrosion resistance.

As has been described above, the refrigerant composition according to the present invention is equal or superior to Freon refrigerants in terms of refrigerating capacity, functions well as a refrigerant, and satisfactorily meets conditions required for refrigerants. Thus, it provides the following advantageous effects:

(a) The evaporating temperature from the atomsphere is low; (b) the condensing pressure is low; (c) the latent heat of vaporization is large in quantity; (d) the freezing point is low; (e) the specific volume is large; (f) the critical temperature is high; (g) the refrigerant composition will not chemically react with a refrigerating machine oil; (h) the viscosity is low, and heat transfer is favorably effected; (i) the referigerant composition has good electrical insulating properties and does not corrode an electrical insulating substances; (j) it has neither flammability nor explosiveness; (k) it is harmless to men and environment; and (l) it can be used in refrigerators originally designed to use a conventional Freon refrigerant as it is without the need of remodeling them.

What is claimed is:

1. A non-azeotropic refrigerant composition for use in a refrigerator comprising a compressor, a condenser, a receiver, an expansion valve and an evaporator, said refrigerant composition consisting essentially of:

at least one $C_1$–$C_4$ gaseous paraffinic hydrocarbon, a polysiloxane flame-retardant for the gaseous hydrocarbon, and at least one ether of the formula R—O—R' wherein R and R' are hydrocarbyl groups.

2. A non-azeotropic refrigerant composition for use in a refrigerator comprising a compressor, a condenser, a receiver, an expansion valve and an evaporator, said refrigerant composition consisting essentially of:

at least one $C_1$–$C_4$ gaseous paraffinic hydrocarbon, a polysiloxane flame-retardant for the gaseous hydrocarbon, at least one ether of the formula R—O—R' wherein R and R' are hydrocarbyl groups, and at least one alcohol.

3. A refrigerant composition according to claim 2, wherein the alcohol is a polyhydric alcohol.

4. A refrigerant composition according to claim 3, wherein the polyhydric alcohol is a mixture of ethylene and propylene glycols.

5. A refrigerant composition according to claim 1, 2 or 3, wherein the paraffinic hydrocarbon is butane.

6. A refrigerant composition according to claim 1, 2 or 3, wherein the polysiloxane is dimethyl polysiloxane.

7. A refrigerant composition according to claim 1, 2 or 3, wherein the ether is diethyl ether.

* * * * *